(12) United States Patent
Ryan et al.

(10) Patent No.: US 8,179,626 B1
(45) Date of Patent: May 15, 2012

(54) ADAPTIVE SHOCK DETECTION

(75) Inventors: Robert P. Ryan, Mission Viejo, CA (US); Don Brunnett, Pleasanton, CA (US); Alain Chahwan, Mission Viejo, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 87 days.

(21) Appl. No.: 12/631,716

(22) Filed: Dec. 4, 2009

(51) Int. Cl.
*G11B 27/36* (2006.01)

(52) U.S. Cl. .............................. 360/31; 360/75; 360/60

(58) Field of Classification Search .................. None
See application file for complete search history.

(56) References Cited

U.S. PATENT DOCUMENTS

| | | | |
|---|---|---|---|
| 5,299,075 A | 3/1994 | Hanks | |
| 5,333,138 A | 7/1994 | Richards et al. | |
| 5,654,840 A | 8/1997 | Patton et al. | |
| 5,663,847 A | 9/1997 | Abramovitch | |
| 5,923,487 A * | 7/1999 | Carlson et al. | 360/60 |
| 6,115,200 A | 9/2000 | Allen et al. | |
| 6,414,813 B2 | 7/2002 | Cvancara | |
| 6,429,990 B2 | 8/2002 | Serrano et al. | |
| 6,538,839 B1 | 3/2003 | Ryan | |
| 6,614,618 B1 | 9/2003 | Sheh et al. | |
| 6,636,377 B1 | 10/2003 | Yu et al. | |
| 6,674,600 B1 | 1/2004 | Codilian et al. | |
| 6,710,966 B1 | 3/2004 | Codilian et al. | |
| 6,754,021 B2 | 6/2004 | Kisaka et al. | |
| 6,795,262 B1 | 9/2004 | Codilian et al. | |
| 6,853,512 B2 | 2/2005 | Ozawa | |
| 6,900,958 B1 | 5/2005 | Yi et al. | |
| 6,909,574 B2 | 6/2005 | Aikawa et al. | |
| 6,914,743 B1 | 7/2005 | Narayana et al. | |
| 6,950,271 B2 | 9/2005 | Inaji et al. | |
| 6,952,318 B1 | 10/2005 | Ngo | |
| 6,958,882 B2 | 10/2005 | Kisaka | |
| 6,967,804 B1 | 11/2005 | Codilian | |
| 7,139,401 B2 | 11/2006 | Culman et al. | |
| 7,142,385 B2 | 11/2006 | Shimotono et al. | |
| 7,154,690 B1 | 12/2006 | Brunnett et al. | |
| 7,382,563 B2 * | 6/2008 | Saitoh et al. | 360/60 |
| 7,423,833 B1 * | 9/2008 | Sutardja | 360/77.03 |
| 7,471,483 B1 | 12/2008 | Ferris et al. | |
| 7,561,365 B2 | 7/2009 | Noguchi et al. | |
| 7,595,953 B1 | 9/2009 | Cerda et al. | |
| 7,596,795 B2 | 9/2009 | Ding et al. | |
| 7,633,704 B2 | 12/2009 | Supino et al. | |

(Continued)

FOREIGN PATENT DOCUMENTS

JP 2001266466 A * 9/2001

OTHER PUBLICATIONS

L. Hakansson, "The Filtered-x LMS Algorithm", Department of Telecommunications and Signal Processing, University of Karlskrona/Ronneby, 372 25 Ronneby, Sweden.

*Primary Examiner* — Jason Olson

(57) ABSTRACT

Adaptive shock detection systems are provided according to various embodiments of the present invention. In one embodiment, an adaptive shock detection system comprises a shock sensing circuit, and a controller configured to receive shock detection signals from the shock sensing circuit and to dynamically adjust a sensitivity of the shock sensing circuit based the received shock detection signals.

24 Claims, 8 Drawing Sheets

U.S. PATENT DOCUMENTS

| | | | |
|---|---|---|---|
| 7,852,588 B1 * | 12/2010 | Ferris et al. | 360/60 |
| 2002/0153451 A1 | 10/2002 | Kiss et al. | |
| 2005/0088774 A1 | 4/2005 | Bahirat et al. | |
| 2006/0291087 A1 | 12/2006 | Suh et al. | |
| 2006/0291101 A1 | 12/2006 | Takaishi | |
| 2008/0174900 A1 | 7/2008 | Abrishamchian et al. | |
| 2009/0135516 A1 | 5/2009 | Takasaki et al. | |
| 2010/0061007 A1 | 3/2010 | Matsushita et al. | |
| 2010/0079906 A1 | 4/2010 | Wile et al. | |

* cited by examiner

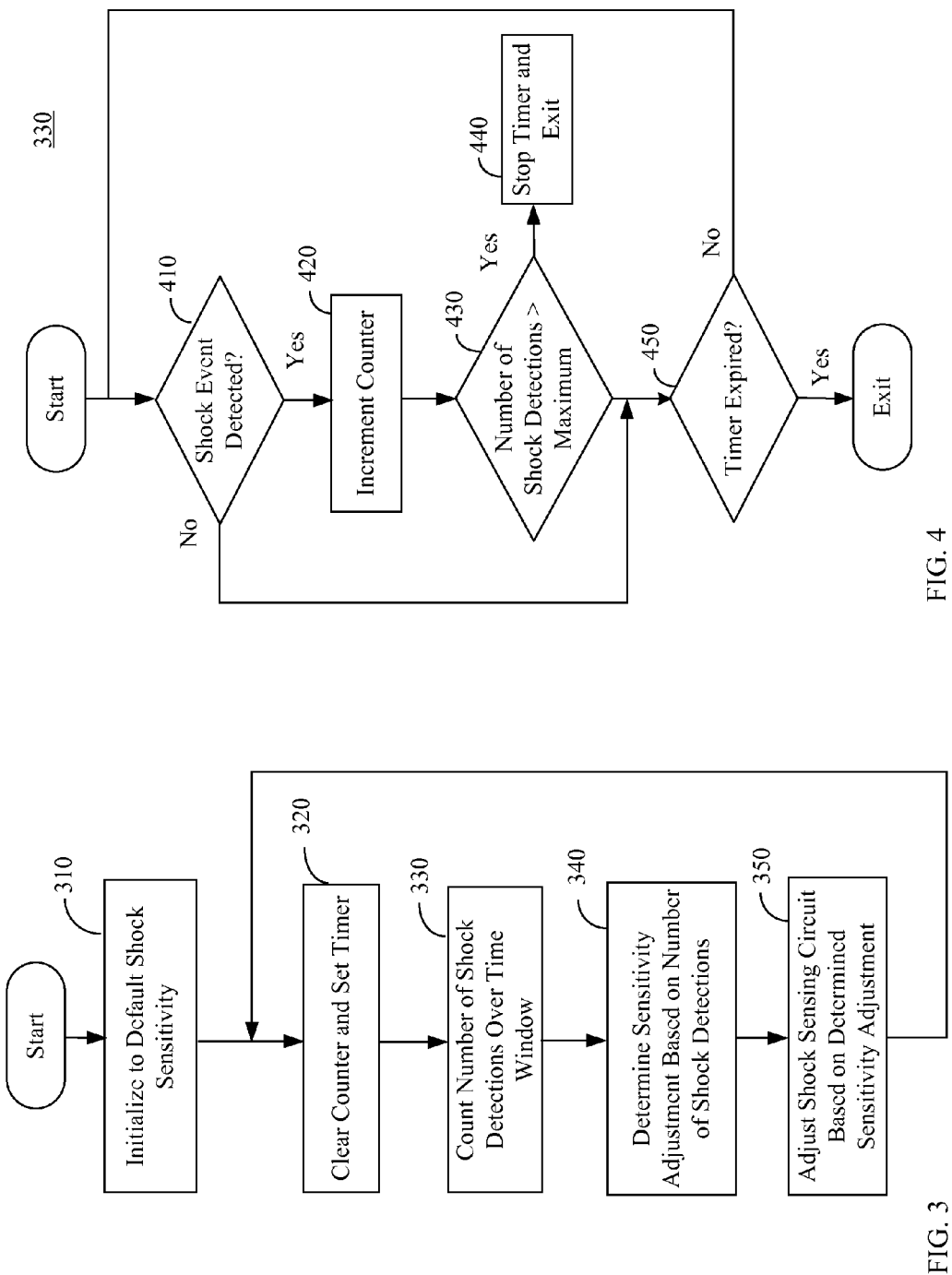

ADAPTIVE SHOCK DETECTION

BACKGROUND OF THE INVENTION

Data storage devices are commonly used to store data in computers, data bases, digital video recorders, and other devices. Data storage devices may include hard disks, solid state memory, or other types of memory.

FIG. 1 shows a prior art disk drive 110 comprising a rotating magnetic disk 115 and a head 120 connected to the distal end of an actuator arm 125, which is rotated about a pivot by a voice coil motor (VCM) 130 to position the head 120 radially over the disk 115. The disk 115 comprises a number of concentric data tracks 140, each partitioned into a number of data sectors. To write data to the disk 115, write circuitry 145 positions the head 120 over a target data track using the VCM 130 and sends the data to the head 120. The head 120 magnetically writes the data to the disk 115 when the head 120 is positioned over a desired data sector of the target data track during rotation of the disk 115.

Disturbances in the disk drive 110, such as vibration and physical shock, are becoming an increasing problem as the number of tracks per inch (TPI) is increased for higher storage capacity. For example, disturbances can cause the head 120 to deviate from the target data track and overwrite a neighboring data track, resulting in a loss of data on the disk 115. To compensate for disturbances, a disk drive 110 may employ an adaptive compensation scheme that detects disturbances using one or more sensors and compensates for the detected disturbances by repositioning the head 120 based on the detected disturbances to keep the head 120 within the target data track.

When compensation is not enough, the disk drive 110 may include a shock sensing circuit 150 that detects certain shock events and a controller 155 that instructs the write circuitry 145 to abort a write operation when a shock event above a certain threshold is detected to prevent off track writing and protect the data on the disk 115. The shock events may include drive/chassis thermal popping and notebook disturbances such as typing, taping and cover-closing, which may exceed the shock specifications of the disk drive in frequency range and/or amplitude. The thermal popping is caused by dissimilar coefficients of thermal expansion among different components inside and outside of the disk drive 110.

Increasing the sensitivity of the shock sensing circuit 150 makes the disk drive 110 more robust against shocks. However, if the shock sensing circuit 150 is tuned to be too sensitive, then a high disturbance environment (e.g., vibrations, power noise, E/B field noise, etc.) can trigger the shock sensing circuit 150 so much that drive performance is reduced to unacceptable levels. This is because, each time the shock sensing circuit 150 is triggered, a scheduled write operation is aborted and delayed until the detected shock passes. As a result, a high rate of shock detections can degrade the data throughput performance of the disk drive 110.

Accordingly, there is a need for adaptive shock detection that provides protection from shock events while maintaining good data throughput performance.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 3 is a flowchart illustrating a method of adaptive shock detection according to an embodiment of the present invention;

FIG. 4 is a flowchart illustrating a method of counting a number of shock detections according to an embodiment of the present invention;

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
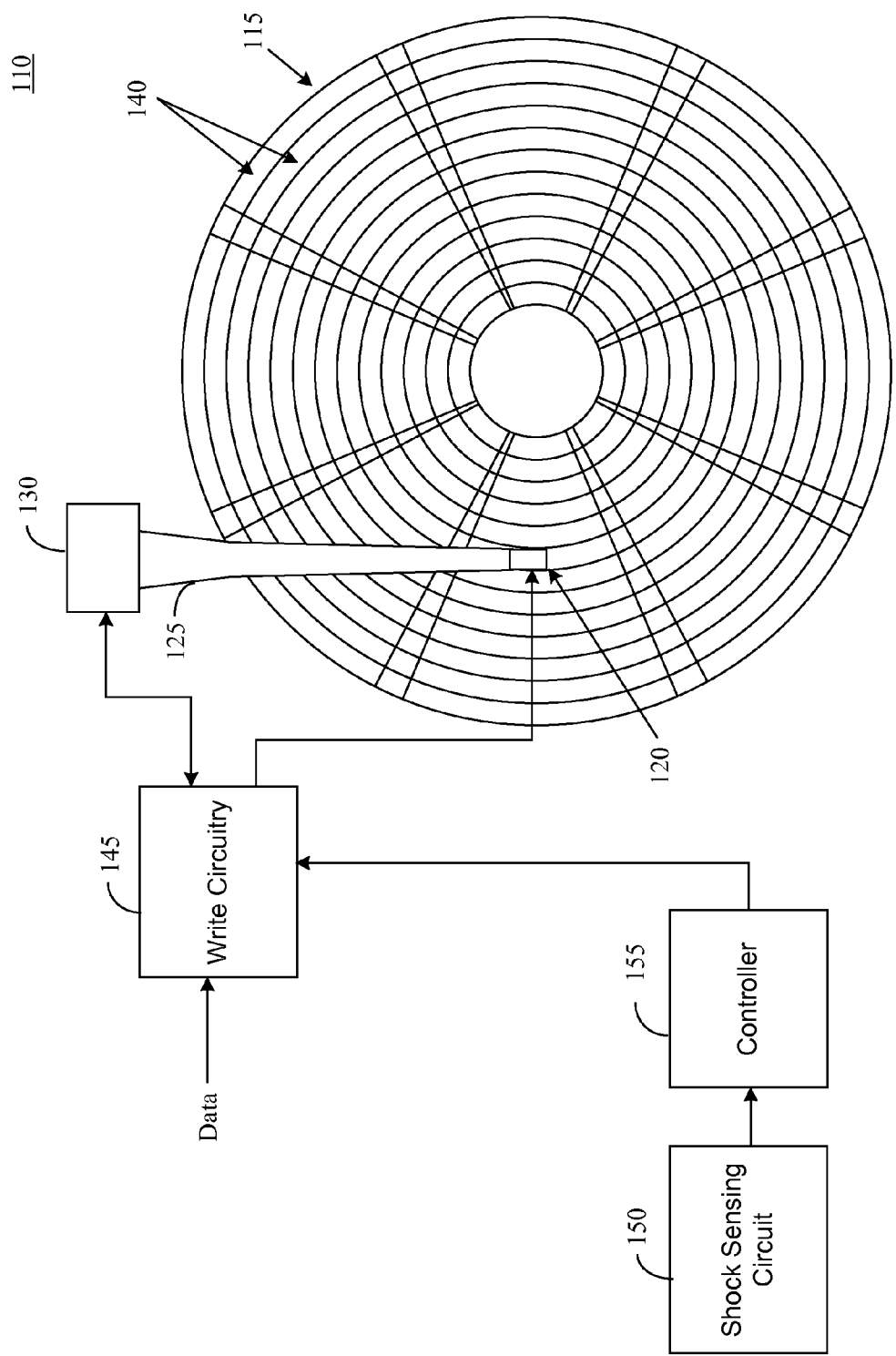
FIG. 1 is a block diagram of a prior art disk drive.
Figure 2A:
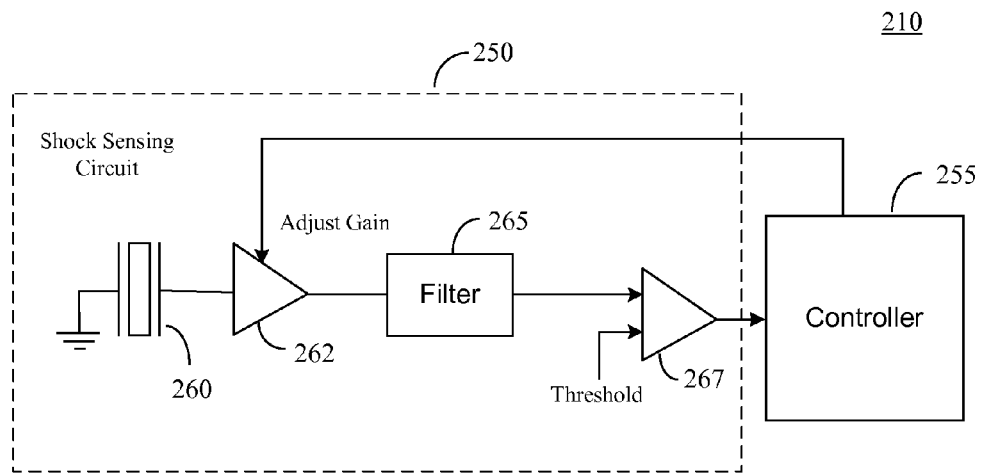
FIGS. 2A and 2B illustrate adaptive shock detection systems according to embodiments of the present invention.

FIG. 2A is a block diagram of an adaptive detection system 210 according to an embodiment of the present invention. The system 210 comprises a shock sensing circuit 250 and a controller 255 configured to dynamically adjust the sensitivity of the shock sensing circuit 250, as discussed further below. The shock sensing circuit 250 comprises a shock sensor 260, an amplifier 262, a filter 265 and a comparator 267.

The shock sensor 260 may comprise an accelerometer or other device capable of sensing shock. The amplifier 262 amplifies the sensor signal from the shock sensor 260 and the filter 265 filters the amplified sensor signal. The comparator 267 then compares the filtered sensor signal with a threshold (e.g., threshold voltage) and outputs a detection signal to the controller 255 when the magnitude of the sensor signal exceeds the threshold. Upon receiving the detection signal, the controller 255 may generate and output a signal to the write circuitry 145 instructing the write circuitry 145 to abort the current write operation.

In one embodiment, the controller 255 dynamically adjusts the sensitivity of the shock sensing circuit 250 by adjusting the gain of the amplifier 262. For a given threshold, increasing the gain of the amplifier 262 increases the sensitivity of the shock sensing circuit 250, while decreasing the gain of the amplifier 262 decreases the sensitivity of the shock sensing circuit 250. Although the shock sensing circuit 250 in the example shown in FIG. 2A has one amplifier 262 between the shock sensor 260 and the filter 265, the shock sensing circuit 250 may include an additional amplifier (not shown) between the filter 265 and the comparator 267. In this embodiment, the gain of one or both of the amplifiers may be adjusted to adjust the sensitivity of the shock sensing circuit 250.

Figure 2B:
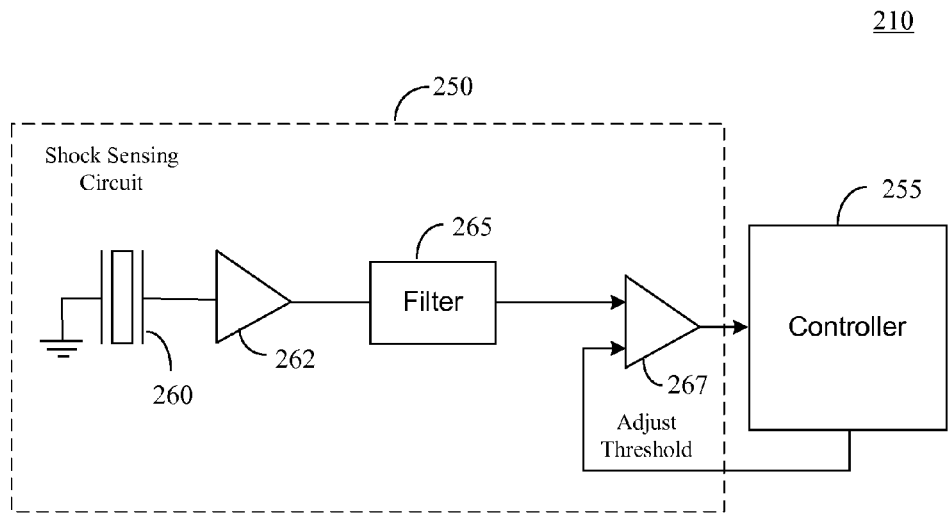

FIG. 2B is a block diagram of the adaptive detection system 210, in which the controller 255 adjusts the sensitivity of the shock sensing circuit 250 by adjusting the threshold of the comparator 267. For a given gain, increasing the threshold decreases the sensitivity of the shock sensing circuit 250, while decreasing the threshold increases the sensitivity of the shock sensing circuit 250.

Further, the controller 255 may adjust the sensitivity of the shock sensing circuit 250 by adjusting the bandwidth and/or transfer function of the filter 265. For example, the controller 255 may adjust the bandwidth of the filter 265 to make the shock sensing circuit 250 sensitive to disturbances having certain frequencies. The adaptive detection system 210 may use any one or a combination of the different techniques described above to adjust the sensitivity of the shock sensing circuit 250. Other techniques may also be employed to adjust the shock sensitivity.

In one embodiment, the controller 255 counts the number of shock detections from the shock sensing circuit 250 over a time window, and adjusts the sensitivity of the shock sensing circuit 250 based on the number of shock detections over the time window. Since the number of shock detections over the time window indicates a rate of shock detections, the controller adjusts the shock sensitivity based on the rate of shock detections from the shock sensing circuit 250.

In one embodiment, the controller 255 decreases the sensitivity of the shock sensing circuit 250 when the number of shock detections over the time window exceeds a certain number. This may occur, for example, when the disk drive 110 is subjected to a high disturbance environment, which may be characterized by repetitive disturbances that can cause the shock sensing circuit 250 to trigger at a high rate if the shock sensing circuit 250 is too sensitive. These disturbances may be caused by E/B field noise, power noise injection from a power supply, vibrations or other sources.

By decreasing the sensitivity of the shock sensing circuit 250 when the number of shock detections exceeds a certain number, the controller 255 decreases the rate at which the shock sensing circuit 250 is triggered. This, in turn, decreases the rate at which write operations to the disk 115 are aborted by shock detections, thereby improving the data throughput performance. Thus, when the number of shock detections exceeds a certain number due to a high disturbance environment, the controller 255 decreases the sensitivity of the shock sensing circuit 250 to improve data throughput to the disk 115.

In one embodiment, the controller 255 is set with a minimum sensitivity to prevent the controller 255 from decreasing the sensitivity of the shock sensing circuit 250 below the minimum sensitivity, even when the number of shock detections exceeds a certain number. In this embodiment, the controller 255 may continue to decrease the sensitivity of the shock sensing circuit 250 to improve data throughput until the sensitivity reaches the minimum sensitivity. The minimum sensitivity may be based on a minimum sensitivity needed to protect the disk drive 110 from certain extreme shock events including high frequency thermal popping, lid slamming or other shock events.

In one embodiment, the time window over which the controller 255 counts the number of shock detections may be based on a number of revolutions or wedges of the disk 115. The number of wedges may be counted by reading servo sector information on the disk 115 using the head 120 as the disk 115 rotates. The number of revolutions may be determined from the wedge count since a track is divided into a known number of wedges. In one example, the controller 255 may count the number of shock detections over a period of 40 revolutions and decrease the shock sensitivity when the number of shock detections exceeds 10 shock detections over 40 revolutions.

Further, the controller 255 may only include disk revolutions during periods of track following and exclude disk revolutions during periods of track seeking. Track following occurs when the head 120 is positioned within a target data track 140 and track seeking occurs when the head 120 is moved between data tracks 140. By only counting the number of shock detections during track following, vibrations during track seeking caused by moving the head 120 between data tracks do not affect the shock detection count. For example, if the disk 115 rotates 20 revolutions during a first period of track following and rotates 20 revolutions during a second period of track following with 10 revolutions of track seeking between the first and second periods of track following, then the controller 255 counts the number of shock detections during the 40 revolutions of track following while ignoring shock detections during the 10 revolutions of track seeking. The time window may also be measured in terms of number of wedges.

In one embodiment, the controller 255 counts the number of shock detections from the shock sensing circuit 250 over a second time window, and increases the sensitivity of the shock sensing circuit 250 when the number of shock detections is below a certain number. Thus, the controller 255 may adaptively increase the sensitivity of the shock sensing circuit 250 when the disk drive 110 is under low disturbance conditions (e.g., low power noise, low vibrations, etc.). This allows the controller 255 to increase shock sensitivity under low disturbance conditions where increases in shock sensitivity have little or no adverse affect on data throughput performance. The increased sensitivity makes the disk drive more robust to transient shock events such as high frequency thermal popping or keyboard tapping.

In one embodiment, the time window used to count the number of shock detections for determining whether to increase shock sensitivity is longer than the time window used to count the number of shock detections for determining whether to decrease shock sensitivity. For example, the time window for determining whether to increase shock sensitivity may be 160 revolutions. In this example, the controller 255 may increase the shock sensitivity when the number of shock detections is below three over 160 revolutions. Thus, in this embodiment, the controller 255 examines the number of shock detections over a longer period before making a determination whether to increase the sensitivity of the shock sensing circuit 250. This provides the controller 255 with a longer sampling period to verify that the disk drive 110 is under low disturbance conditions before increasing the sensitivity.

In one embodiment, the controller 255 may use a position error signal to determine whether a high rate of shock detections from the shock sensing circuit 250 is caused by power noise injection or other noise source instead of physical shock. The position error signal may be generated by reading servo information on the disk 115 using the head 120, where the servo information indicates the position of the head 120 over the disk 115. In this embodiment, the controller 255 may determine that a high rate of shock detections is caused by a noise source when the position error signal is small during the same period. In this case, the controller 120 may decrease the shock sensitivity of the shock sensing circuit 250 until the rate of shock detections (e.g., number of shock detections over a time window) is reduced to a certain level.

In one embodiment, the controller 255 may receive the sensor signal from the filter 265 via a signal path (not shown), perform a measurement on the sensor signal and adjust the sensitivity of the shock sensing circuit 250 based on the measurement. For example, the controller 255 may measure a root mean square (RMS) or mean square error (MSE) of the sensor signal and adjust the sensitivity of the shock sensing circuit 250 accordingly. In this example, the controller 255 may decrease the sensitivity of the shock sensing circuit 250 when the RMS or MSE of the sensor signal is above a certain threshold. In another example, the controller 255 may perform a fast Fourier transform (FFT) on the sensor signal to measure the magnitude of the sensor signal at different frequencies. If the magnitude of the sensor signal at a certain frequency or within a frequency band is above a threshold, then the controller 255 may adjust the filter 265 to suppress signals at the frequency or within the frequency band. This way, the controller 255 can adjust the filter 265 to suppress high disturbances at certain frequencies while maintaining shock sensitivity at other frequencies. To process the sensor signal, the controller 255 may include an analog to digital converter for converting the sensor signal into digital form.

The controller 255 may be implemented using one or more processors for executing instructions and may further include memory, such as a volatile or non-volatile memory, for storing data (e.g., data being processed) and/or instructions. The instructions may be executed by the one or more processors to perform the various functions of the controller 255 described in the disclosure. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

A method of adaptive shock detection that may be performed by the controller 255 will now be discussed with reference to FIGS. 3 and 4.

In step 310, the controller 255 initializes the sensitivity of the shock sensing circuit 250 to a default shock sensitivity. In step 320, the controller 255 clears a counter and sets a timer to zero. The counter is used to count the number of shock detections from the shock sensing circuit 250 and the timer is used to keep track of the time window over which the number of shock detections is counted. Both the counter and timer may be implemented in the controller 255 as firmware, hardware or a combination of both. For the embodiment in which the time window is measured by a number of disk revolutions during track following, the timer keeps track of the number of disk revolutions during track following.

In step 330, the controller 255 counts the number of shock detections over the time window, for example, 40 disk revolutions during track following. The time window may also be measured in terms of number of wedges. Step 330 is discussed in more detail below with reference to FIG. 4. In step 340, the controller 255 determines whether to adjust the shock sensitivity based on the number of shock detections. For example, the controller 255 may determine to decrease the shock sensitivity if the number of shock detections exceeds 10 over 40 revolutions.

In step 350, the controller 255 adjusts the sensitivity of the shock sensing circuit 250 based on the determination in step 340. For example, the controller 255 may decrease the shock sensitivity by a step when the determination in step 340 is to decreases the shock sensitivity. The controller 25 may adjust the shock sensitivity by adjusting the gain of the amplifier 262, adjusting the threshold of the comparator 267 or a combination of both. After step 350, the controller 255 returns to step 320 and repeats steps 320 through 350.

In step 340, the controller 340 may also examine the total number of shock detections over a longer time window by adding two or more counts from step 330. For example, if the controller 255 counts the number of shock detections over 40 revolutions in step 330, then the controller 255 may examine the total number of shock detections over 160 revolutions by adding the last four counts from step 330. In this example, the controller 255 may determine to increase the shock sensitivity if the total number of shock detections over 160 revolutions is below three.

In step 340, the controller 340 may also determine that no adjustment of the shock sensing circuit 250 is needed. For example, the controller 340 may determine not to adjust the shock sensitivity if the number of shock detections is below 10 over 40 revolutions.

Step 330 will now be described in more detail with reference to FIG. 4 according to an embodiment of the present invention. In step 410, the controller 255 determines whether a shock event has been detected by the shock sensing circuit 250. If a shock event has been detected, then the controller 255 increments the counter counting the number of shock detections by one in step 420. If a shock event has not been detected, then the controller 255 advances to step 450.

In step 430, the controller 255 determines whether the number of shock detections in the counter is above a maximum number of shock detections. If the number of shock detections is above the maximum, then the controller 255 advances to step 440. In step 440, the controller 255 stops the timer and exits step 330. In this case, the controller 225 may determine to decrease the shock sensitivity in step 340 when the number of shock detections exceeds the maximum in step 330, even before the time window expires. Thus, if the number of shock detections is high, then the controller 255 may quickly reduce the shock sensitivity even before the time window expires to improve data throughput performance.

If the number of shock detections is not above the maximum, then the controller 255 advances to step 450. In step 450, the controller 255 determines whether the timer has expired. For example, if the time window is 40 disk revolutions, then the controller 255 determines whether the timer has reached 40 disk revolutions. The time window may also be measured in terms of wedges, in which the timer expires when a certain number of wedges has been reached. If the timer has not expired, then the controller 255 returns to step 410. Otherwise, the controller 255 exits step 330 and uses the number of shock detections in the counter to determine whether to adjust the shock sensitivity in step 340, as discussed above.

Figure 5A:
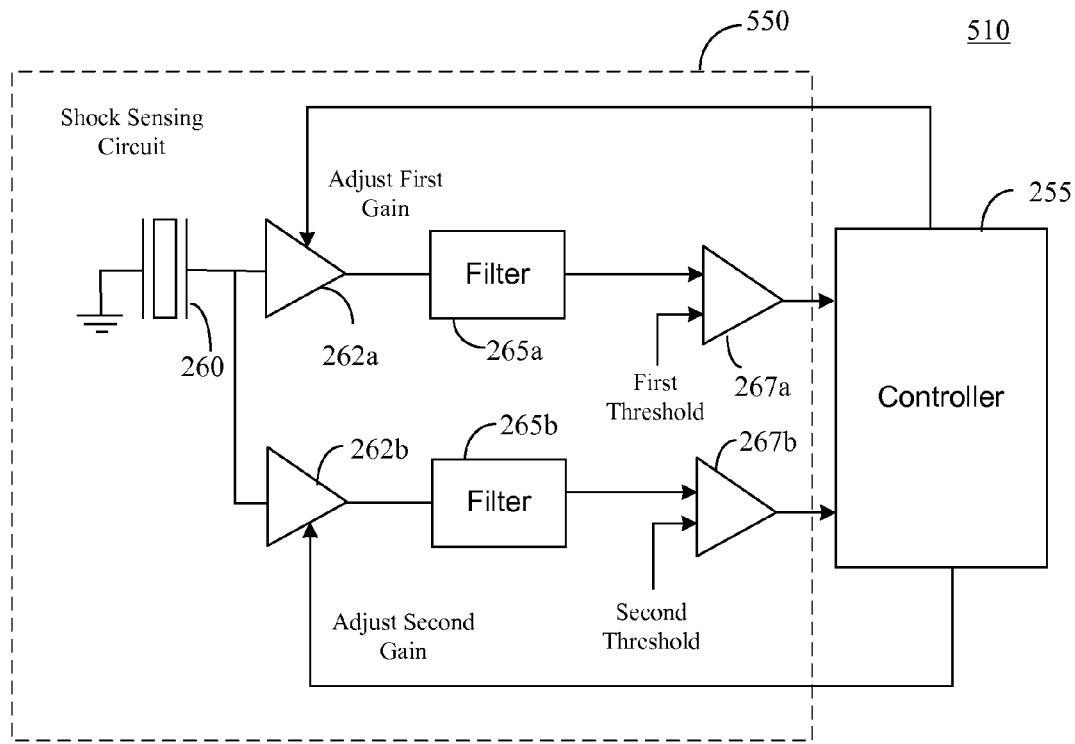
FIGS. 5A and 5B illustrate adaptive shock detections systems having two shock sensitivity settings according to embodiments of the present invention.

FIG. 5A is a block diagram of an adaptive detection system 510 according to another embodiment of the present invention. The system 510 comprises a shock sensing circuit 550 and the controller 255. The shock sensing circuit 550 comprises a shock sensor 260, first and second amplifiers 262*a* and 262*b*, first and second filters 265*a* and 265*b* and first and second comparators 267*a* and 267*b*, as shown in FIG. 5A.

In this embodiment, the output sensor signal from the shock sensor 260 is processed by the first amplifier 262*a*, the first filter 265*a* and the first comparator 267*a*. The first comparator 267*a* compares the sensor signal from the first filter 265*a* to a first threshold and outputs a detection signal to the controller 255 when the sensor signal exceeds the first threshold. The output sensor signal from the shock sensor 260 is also processed by the second amplifier 262*b*, the second filter 265*b* and the second comparator 267*b*. The second comparator 267b compares the sensor signal from the second filter 265b to a second threshold and outputs a detection signal to the controller 255 when the sensor signal exceeds the second threshold.

In this embodiment, the shock sensing circuit 550 has a first sensitivity setting associated with the first amplifier 262a, the first filter 265a and the first comparator 267a and a second sensitivity setting associated with the second amplifier 262b, the second filter 265b and the second comparator 267b. The controller 255 may independently adjust the first and second sensitivity settings by independently adjusting the gains of the first and second amplifiers 262a and 262b, respectively. Thus, the shock sensing circuit 550 according to this embodiment can output two detection signals to the controller 255 based on different sensitivity settings, each of which can be adjusted independently by the controller 255.

Figure 5B:
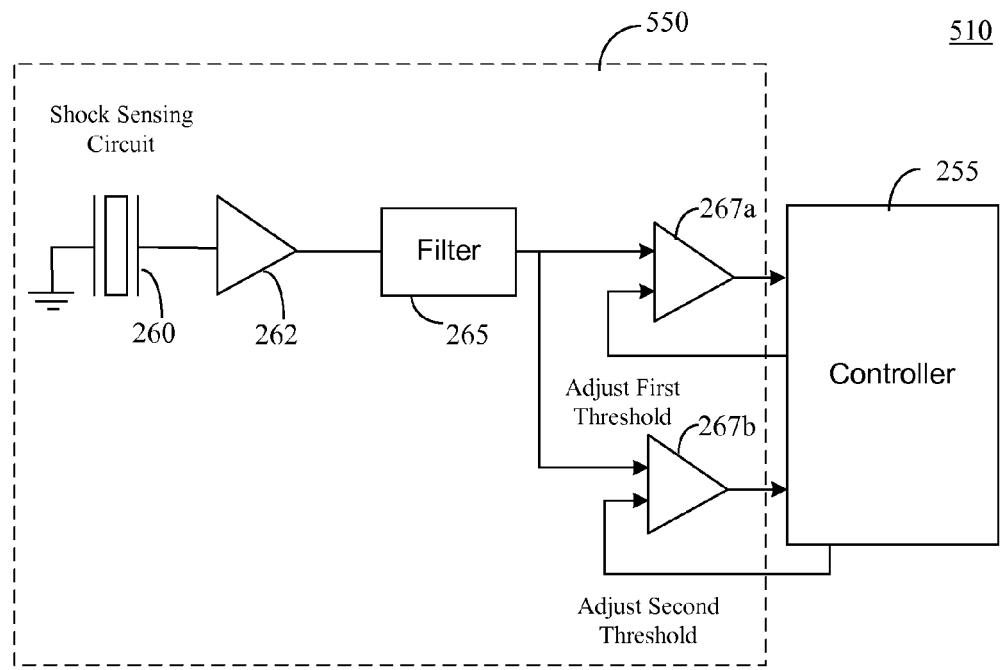

FIG. 5B is block diagram of the adaptive detection system 510, in which the first and second sensitivity settings of the shock sensing circuit 550 are adjusted by adjusting the first and second thresholds of the first and second comparators 267a and 267b, respectively. In this embodiment, the sensor signal from the shock sensor 260 is processed by the amplifier 262 and the filter 265, and the output of the filter 265 is inputted to both the first and second comparators 267a and 267b. The first comparator 267a outputs a detection signal to the controller 255 when the sensor signal from the filter 265 exceeds the first threshold and the second comparator 267b outputs a detection signal to the controller 255 when the sensor signal from the filter 265 exceeds the second threshold.

In one embodiment, the controller 255 uses shock detections based on the first sensitivity setting to abort write operations and uses shock detections based on the second sensitivity setting to find a noise floor of a high disturbance environment. The high disturbance environment may be characterized by repetitive disturbances that can cause the shock sensing circuit 550 to trigger at a high rate if the shock sensing circuit 550 is too sensitive. These disturbances may be caused by E/B field noise, power noise injection from a power supply, vibrations or other sources. The noise floor may correspond to a shock sensitivity at which the repetitive disturbances begin to trigger a high rate of shock detections.

In this embodiment, the controller 255 monitors the shock detections based on the second sensitivity setting to find the noise floor of the high disturbance environment and keep the second sensitivity setting close to the noise floor. For example, when the number of shock detections based on the second sensitivity is high, the controller 255 may find the noise floor by decreasing the second sensitivity settings until the number of shock detections based on the second sensitivity setting drops below a certain number over a time window. When the number of shock detections based on the second sensitivity is low, the controller 255 may find the noise floor by increasing the second sensitivity setting until the number of shock detections based on the second sensitivity setting exceeds a certain number over a time window.

In this embodiment, the controller 255 may keep a gap between the first and second sensitivity settings, in which the first sensitivity setting is slightly lower than the second sensitivity setting. For the example in which the first and second sensitivity settings are adjusting using the first and second thresholds, respectively, the controller 255 may maintain a gap between the first and second thresholds, in which the first threshold is kept slightly higher than the second threshold.

In this embodiment, the controller 255 may adjust the first and second sensitivity settings in parallel to maintain the gap between the first and second sensitivity settings. For example, when the controller 255 increases the second sensitivity setting, the controller 255 may also increase the first sensitivity setting by the same amount. Similarly, when the controller 255 decreases the second sensitivity setting, the controller 255 may also decrease the first sensitivity setting by the same. As discussed above, the second sensitivity setting is adjusted using the shock detections based on the second sensitivity setting. Thus, the shock detections based on the second sensitivity setting are used to adjust both the first and second sensitivity settings.

Thus, the controller uses shock detections based on the first sensitivity setting to trigger write aborts and uses shock detections based on the second sensitivity setting to determine the noise floor of a high disturbance environment. In addition, the controller adjusts both sensitivity settings based on the determined noise floor, while keeping the first sensitivity setting slightly lower than the second sensitivity setting. This allows the controller 255 to adjust the first sensitivity setting based on the noise floor while minimizing the impact on write performance. This is because shock detections based on the second sensitivity setting, which are used to determine the noise floor, do not trigger write aborts. As a result, the occurrence of these shock detections in determining the noise floor do not trigger write aborts. The first sensitivity setting is kept slightly lower than the second sensitivity setting. This prevents shock detections based on the first sensitivity setting, which trigger write aborts, from occurring as the second sensitivity setting is adjusted close to the noise floor.

Figure 6:
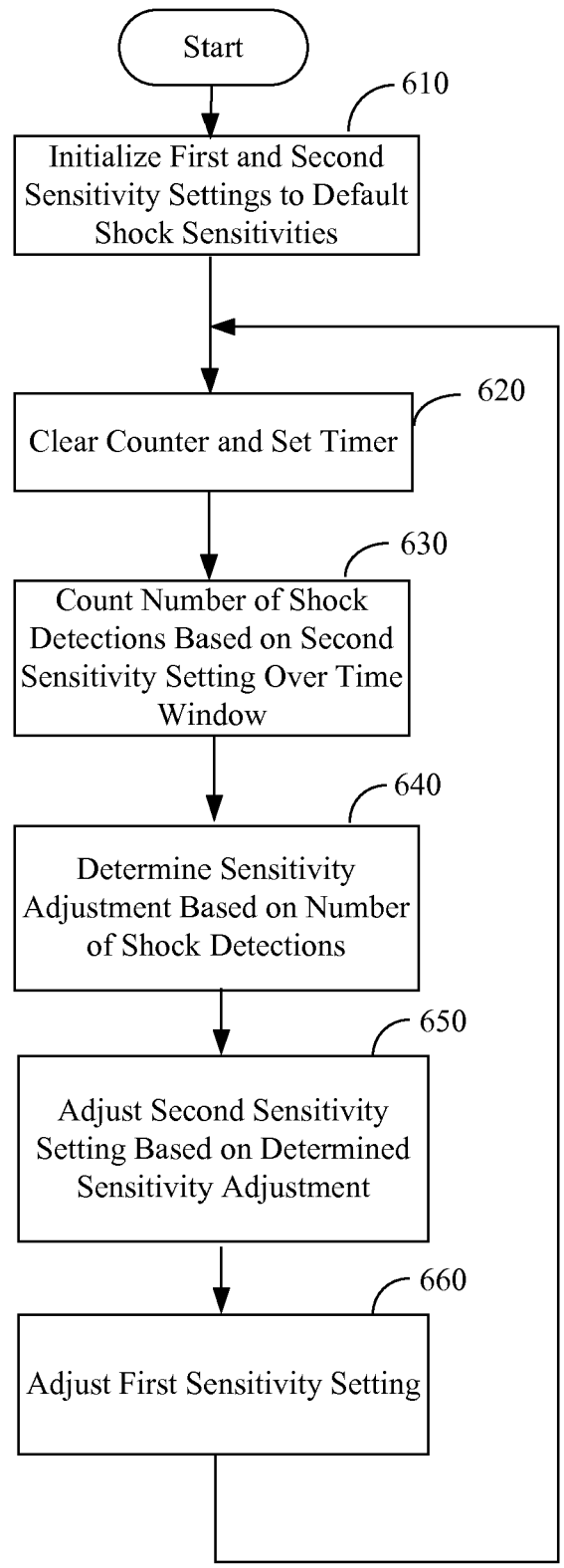
FIG. 6 is a flowchart illustrating a method of adaptive shock detection according to another embodiment of the present invention.

A method of adaptive shock detection using two sensitivity settings that may be performed by the controller 255 will now be discussed with reference to FIG. 6.

In step 610, the controller 255 initializes the first and second sensitivity settings of the shock sensing circuit 550 to default shock sensitivities. The controller 255 may initialize the first sensitivity setting to a lower sensitivity than the second sensitivity setting. In step 620, the controller 255 clears a counter and sets a timer to zero.

In step 630, the controller 255 counts the number of shock detections based on the second sensitivity setting over a time window, for example, 40 disk revolutions. Step 630 may be similar to the method shown in FIG. 4, in which the shock detections are based on the second sensitivity setting. In step 640, the controller 255 determines whether to adjust the second sensitivity setting based on the number of shock detections. For example, the controller 255 may determine to decrease the shock sensitivity if the number of shock detections exceeds a certain amount over the time window.

In step 650, the controller 255 adjusts the second sensitivity setting based on the determination in step 640. For example, the controller 255 may adjust the second sensitivity setting by adjusting the gain of the second amplifier 262b, adjusting the second threshold of the second comparator 267b or a combination of both.

In step 660, the controller 255 adjusts the first sensitivity setting based on the determination in step 640. For example, the controller 255 may adjust the first sensitivity setting by the same amount as the second sensitivity, while maintaining a gap between the first and second sensitivity settings, in which the first sensitivity setting is lower than the second sensitivity setting. The controller 255 may adjust the first sensitivity setting by adjusting the gain of the first amplifier 262a, adjusting the first threshold or a combination of both. As discussed above, shock detections based on the first sensitivity setting are used to trigger write aborts.

After step 660, the controller 255 returns to step 620 and repeats steps 620 through 660.

Figure 7:
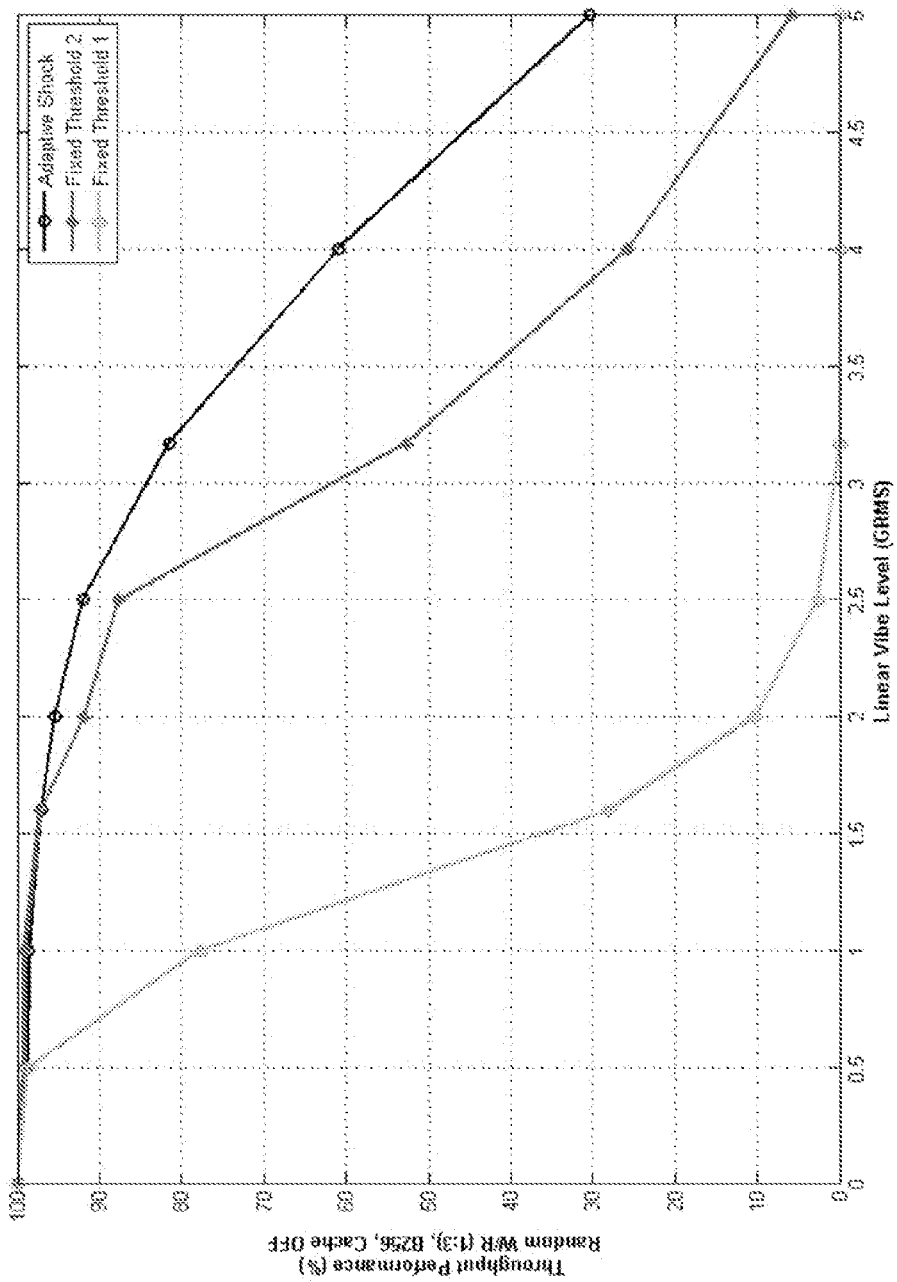
FIG. 7 is a plot showing an example of data throughput versus GRMS (root mean square acceleration) over a frequency range of 10-500 Hz for a disk drive using adaptive shock detection and fixed thresholds according to an embodiment of the present invention.

FIG. 7 shows a plot demonstrating improved data throughput achieved with adaptive shock detection. The plot shows data throughput versus GRMS (root mean square acceleration) over a frequency range of 10-500 Hz for a disk drive using adaptive shock detection, fixed threshold T1 and fixed threshold T2. Fixed threshold T2 is higher than fixed threshold T1. As shown in FIG. 7, the higher fixed threshold T2 results in better throughput performance than the lower fixed threshold T1. The adaptive shock detection results in better throughput performance than both fixed thresholds T1 and T2.

Figure 8:
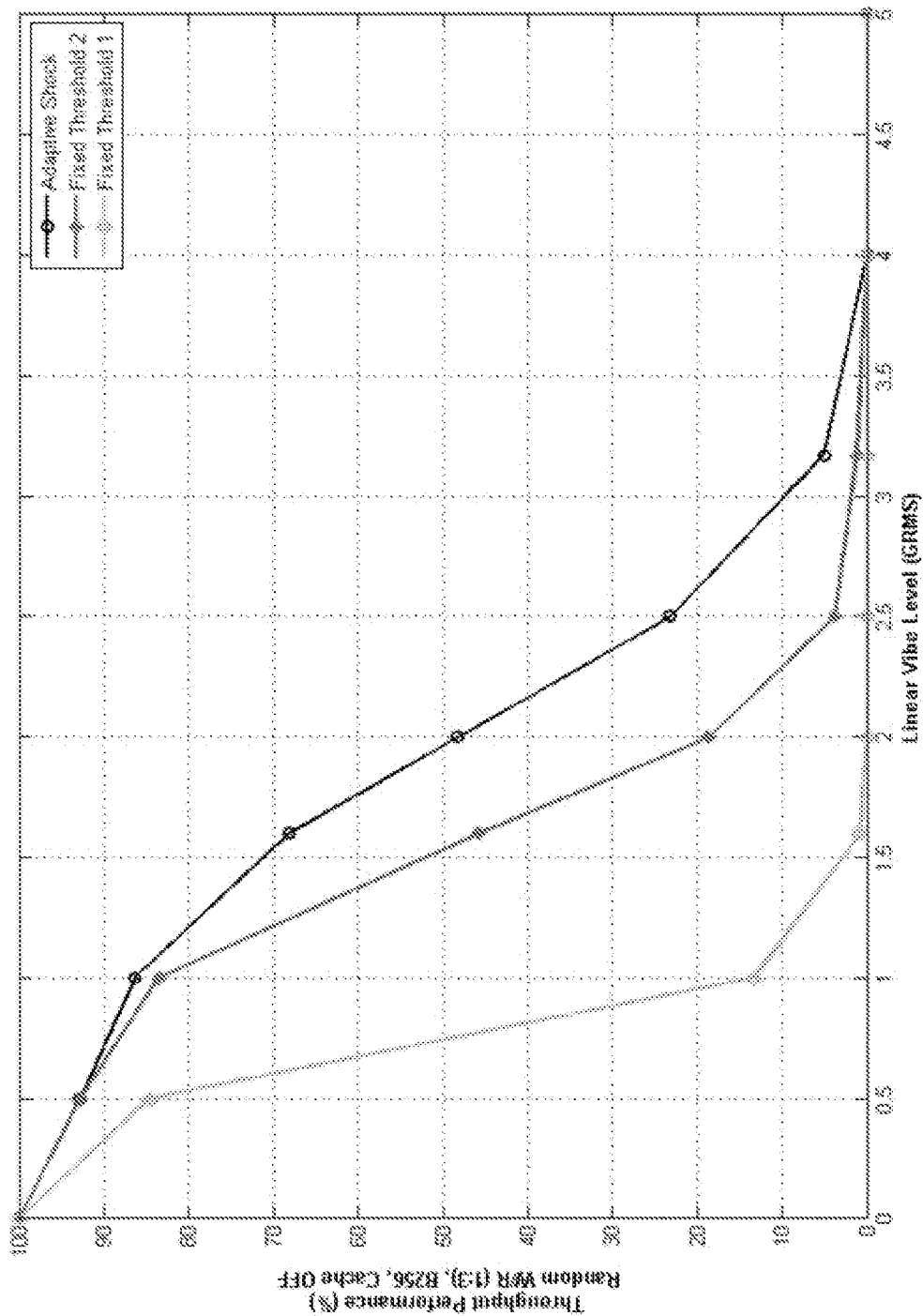
FIG. 8 is a plot showing an example of data throughput versus GRMS over a frequency range of 10-800 Hz for a disk drive using adaptive shock detection and fixed thresholds according to an embodiment of the present invention.

FIG. 8 shows another plot demonstrating improved data throughput achieved with adaptive shock detection. The plot shows data throughput versus GRMS (root mean square acceleration) over a frequency range of 10-800 Hz for the disk drive using adaptive shock detection, fixed threshold T1 and fixed threshold T2. As shown in FIG. 8, adaptive shock detection results in better throughput performance than both fixed thresholds T1 and T2.

As discussed above, the controller 255 is able to adaptively increase shock sensitivity under low disturbance conditions where increases in sensitivity have little or no adverse affect on data throughput performance. The increased sensitivity makes the disk drive more robust to extreme transient shock events such as thermal popping.

Figure 9:
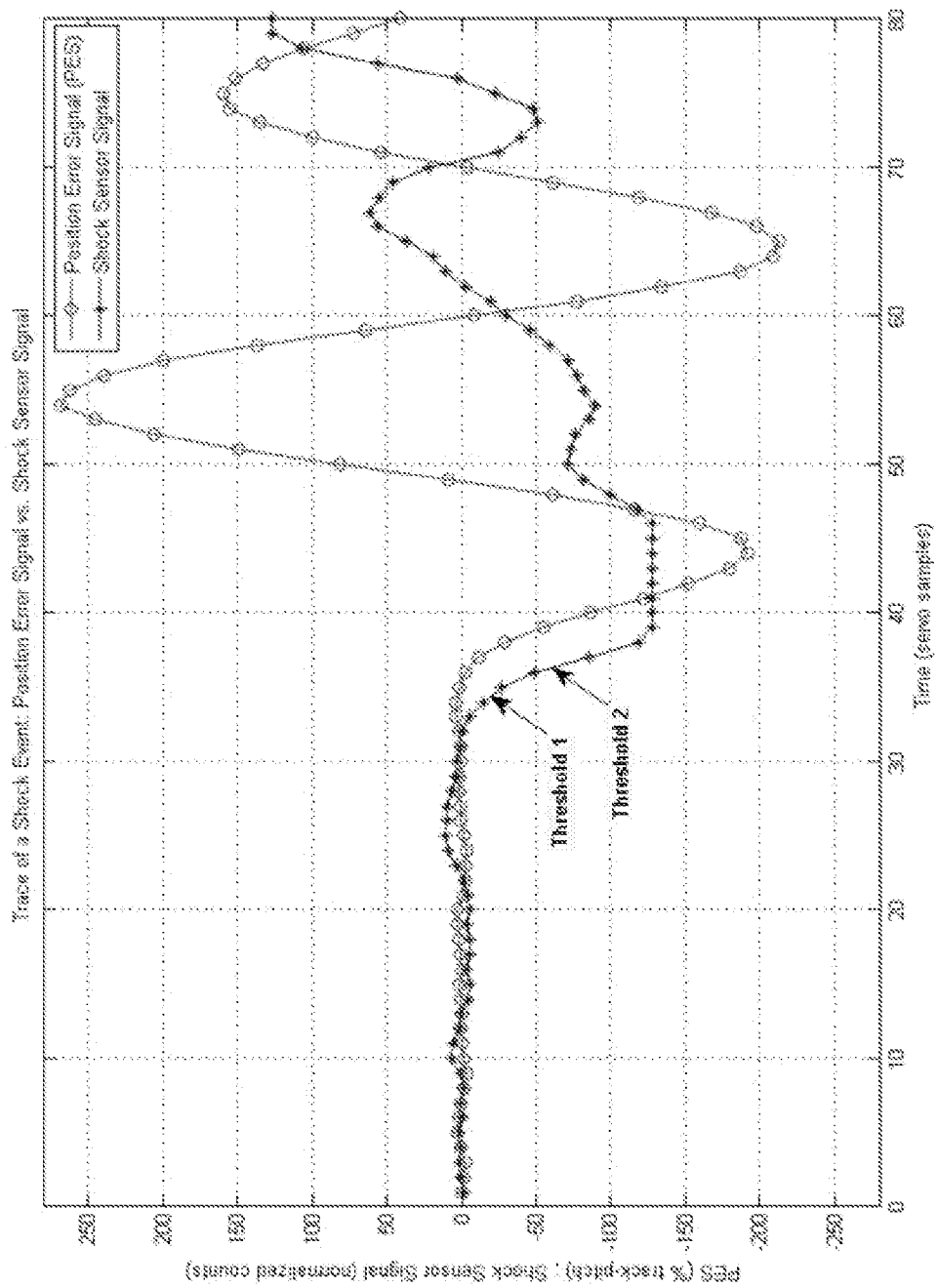
FIG. 9 is a plot showing an example of a position error signal and a shock sensor signal versus time during a shock event according to an embodiment of the present invention.

This is demonstrated in FIG. 9, which shows a plot of a position error signal and a shock sensor signal versus time during a shock event. The position error signal indicates the amount by which the head 120 is moved off track during the shock event. The plot also shows a low threshold 1 and a high threshold 2 corresponding to lower sensitivity. The disk drive aborts a write operation when the magnitude of the shock sensor signal is greater than the threshold of the shock sensing circuit. As shown in FIG. 9, when the low threshold T1 is used, the disk drive aborts the write operation when the position error signal is smaller (well before corruption of a neighboring track), and thus provides a larger safety margin against off track writes than the high threshold T2.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An adaptive shock detection system, comprising:
   a shock sensing circuit; and
   a controller configured to receive shock detection signals from the shock sensing circuit and to dynamically adjust a sensitivity of the shock sensing circuit based on the received shock detection signals and to count a number of the shock detection signals from the shock sensing circuit over a first time window and to adjust the sensitivity of the shock sensing circuit based on the number of the shock detection signals,
   wherein the first time window comprises two time periods of track following in a disk drive and excludes a time period of track seeking in the disk drive between the two time periods of the track following.

2. The system of claim 1, wherein the shock sensing circuit comprises:
   a shock sensor; and
   a comparator to receive a sensor signal based on an output signal from the shock sensor, to compare the sensor signal with a threshold, and to output a shock detection signal to the controller based on the comparison.

3. The system of claim 2, wherein the controller is configured to adjust the sensitivity of the shock sensing circuit by adjusting the threshold.

4. The system of claim 2, wherein the shock sensing circuit comprises an amplifier configured to amplify the sensor signal to the comparator, and wherein the controller is configured to adjust the sensitivity of the shock sensing circuit by adjusting a gain of the amplifier.

5. The system of claim 2, wherein the shock sensing circuit comprises a filter configured to filter the sensor signal to the comparator, and wherein the controller is configured to adjust the sensitivity of the shock sensing circuit by adjusting a bandwidth or transfer function of the filter.

6. The system of claim 2, wherein the controller is configured to measure a root mean square, a mean square error, or fast Fourier transform of the sensor signal and to adjust the sensitivity of the shock sensing circuit based on the root mean square, mean square error, or fast Fourier transform of the sensor signal.

7. The system of claim 1, wherein the controller is configured to determine a rate of the shock detection signals from the shock sensing circuit and to adjust the sensitivity of the shock sensing circuit based on the rate of the shock detection signals.

8. The system of claim 1, wherein the controller is configured to count a number of the shock detection signals from the shock sensing circuit over a first time window and to adjust the sensitivity of the shock sensing circuit based on the number of the shock detection signals, wherein the first time window is based on a period of time for reading servo sector information indicating wedges on a disk as the disk rotates.

9. The system of claim 8, wherein the controller is configured to decrease the sensitivity of the shock sensing circuit if the number of the shock detection signals over the first time window exceeds a first number.

10. The system of claim 9, wherein the controller is configured to count a number of the shock detection signals from the shock sensing circuit over a second time window and to increase the sensitivity of the shock sensing circuit if the number of the shock detection signals over the second time window is below a second number.

11. The system of claim 1, wherein the shock sensing circuit is configured to sense shocks within a disk drive.

12. The system of claim 1, wherein the controller is configured to abort a write operation when the controller receives a shock detection signal from the shock sensing circuit.

13. An adaptive shock detection system, comprising:
a shock sensing circuit; and
a controller configured to:
receive shock detection signals from the shock sensing circuit and to dynamically adjust a sensitivity of the shock sensing circuit based on the received shock detection signals,
count a number of the shock detection signals from the shock sensing circuit over a first time window and to adjust the sensitivity of the shock sensing circuit based on the number of the shock detection signals,
count a number of the shock detection signals from the shock sensing circuit over a second time window and to increase the sensitivity of the shock sensing circuit if the number of the shock detection signals over the second time window is below a second number, and
decrease the sensitivity of the shock sensing circuit if the number of the shock detection signals over the first time window exceeds a first number,
wherein the first time window comprises two time periods of track following in a disk drive and excludes a time period of track seeking in the disk drive between the two time periods of the track following, and wherein the second time window is longer than the first time window.

14. An adaptive shock detection system, comprising:
a shock sensing circuit configured to output first shock detection signals and second shock detection signals; and
a controller configured to:
receive the first and second shock detection signals from the shock sensing circuit,
abort write operations based on the first shock detections from the shock sensing circuit,
count a number of the second shock detection signals from the shock sensing circuit, and
dynamically adjust the sensitivity of the shock sensing circuit based at least on the number of the second shock detection signals.

15. The system of claim 14, wherein the shock sensing circuit has a first sensitivity setting for the first shock detection signals and a second sensitivity setting for the second shock detection signals, and the second sensitivity setting is higher than the first sensitivity setting.

16. A method for adaptively adjusting a shock sensing circuit, comprising:
receiving first shock detection signals and second shock detection signals from the shock sensing circuit;
aborting write operations based on the first shock detections from the shock sensing circuit;
counting a number of the second shock detection signals from the shock sensing circuit; and
adjusting a sensitivity of the shock sensing circuit based on the number of the received second shock detection signals.

17. The method of claim 16, wherein the adjusting the sensitivity of the shock sensing circuit comprises adjusting a threshold to a comparator of the shock sensing circuit.

18. The method of claim 16, wherein the adjusting the sensitivity of the shock sensing circuit comprises adjusting a gain of an amplifier of the shock sensing circuit.

19. The method of claim 16, wherein the adjusting the sensitivity of the shock sensing circuit comprises adjusting a bandwidth or a transfer function of a filter of the shock sensing circuit.

20. The method of claim 16, wherein the adjusting the sensitivity of the shock sensing circuit comprises:
determining a rate of the shock detection signals from the shock sensing circuit; and
adapting the shock sensing circuit based on the rate of the shock detection signals.

21. The method of claim 16, wherein the adjusting the sensitivity of the shock sensing circuit comprises:
counting a number of the shock detection signals from the shock sensing circuit over a first time window; and
adjusting the sensitivity of the shock sensing circuit based on the number of the shock detection signals.

22. The method of claim 21, wherein the adjusting the sensitivity of the shock sensing circuit based on the number of the shock detection signals comprises decreasing the sensitivity of the shock sensing circuit if the number of the shock detection signals over the first time window exceeds a first number.

23. The method of claim 22, further comprising:
counting a number of the shock detection signals from the shock sensing circuit over a second time window; and
increasing the sensitivity of the shock sensing circuit if the number of the shock detection signals over the second time window is below a second number.

24. A method for adaptively adjusting a shock sensing circuit, comprising:
receiving shock detection signals from the shock sensing circuit;
counting a number of the shock detection signals from the shock sensing circuit over a first time window and second time window, wherein the second time window is longer than the first time window; and
adjusting a sensitivity of the shock sensing circuit based on the received shock detection signals based on decreasing the sensitivity of the shock sensing circuit if the number of the shock detection signals over the first time window exceeds a first number and increasing the sensitivity of the shock sensing circuit if the number of the shock detection signals over the second time window is below a second number.

* * * * *